United States Patent [19]

Cowan

[11] Patent Number: 5,439,056
[45] Date of Patent: Aug. 8, 1995

[54] COAL SLAG SOLIDIFICATION OF DRILLING FLUID

[75] Inventor: Kenneth M. Cowan, Sugar Land, Tex.

[73] Assignee: Shell Oil Company, Houston, Tex.

[21] Appl. No.: 84,660

[22] Filed: Jun. 28, 1993

[51] Int. Cl.$^6$ .................................. E21B 33/138
[52] U.S. Cl. .................. 166/293; 106/790; 106/791; 166/292
[58] Field of Search ............. 166/292, 293; 106/767, 106/789, 790, 791; 175/65; 507/140

[56] References Cited

U.S. PATENT DOCUMENTS

| | | |
|---|---|---|
| 2,191,312 | 2/1940 | Cannon . |
| 2,882,873 | 2/1958 | Harmsen et al. . |
| 3,053,764 | 9/1962 | Hummel et al. ............ 507/140 |
| 3,376,146 | 4/1968 | Mitchell ..................... 166/292 X |
| 3,499,491 | 3/1970 | Wyant et al. . |
| 3,557,876 | 4/1969 | Tragesser . |
| 3,964,921 | 6/1976 | Persinski et al. . |
| 4,174,974 | 11/1979 | Fondriest . |
| 4,441,840 | 4/1984 | Bassier et al. ............... 405/267 |
| 4,560,812 | 12/1985 | Blytas . |
| 4,664,843 | 5/1987 | Burba, III et al. . |
| 4,674,574 | 6/1987 | Savoly et al. . |
| 4,756,761 | 7/1988 | Philip et al. . |
| 4,780,220 | 10/1988 | Peterson . |
| 4,897,119 | 1/1990 | Clarke . |
| 5,007,489 | 4/1991 | Enright et al. . |
| 5,020,598 | 6/1991 | Cowan et al. . |
| 5,058,679 | 10/1991 | Hale et al. . |
| 5,073,197 | 12/1991 | Majumdar et al. . |
| 5,082,499 | 1/1992 | Shen . |
| 5,084,102 | 1/1992 | Brouns et al. . |
| 5,091,349 | 2/1992 | Alpert et al. . |
| 5,106,422 | 4/1992 | Bennett et al. . |
| 5,133,806 | 7/1992 | Sakamoto et al. . |
| 5,161,470 | 11/1992 | Dobozi et al. . |
| 5,166,109 | 11/1992 | Alpert et al. . |
| 5,168,008 | 12/1992 | Yoshida et al. . |
| 5,211,250 | 5/1993 | Kubena, Jr. et al. ......... 507/140 X |

FOREIGN PATENT DOCUMENTS 1048454A 8/1984 Japan .
833704 4/1979 U.S.S.R. .

Primary Examiner—George A. Suchfield

[57] ABSTRACT

Drilling fluid is solidified by the incorporation therein of coal slag. In a preferred embodiment lime is also incorporated into said drilling fluid and/or said drilling fluid is a lime drilling fluid. Thus, there is provided a cementitious composition comprising drilling fluid, coal slag and, generally, lime.

13 Claims, 1 Drawing Sheet

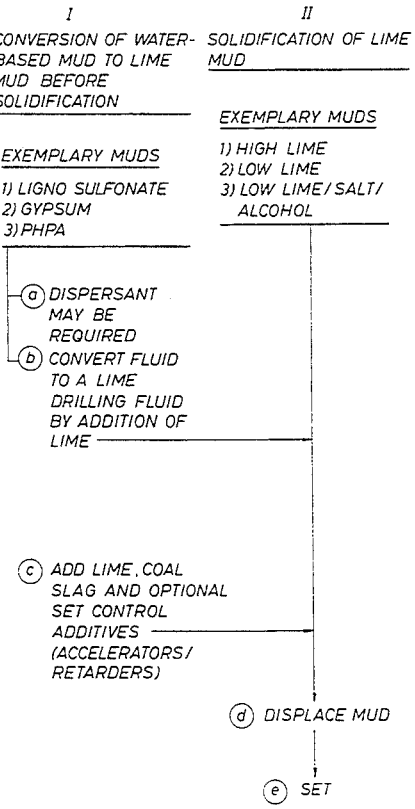

PROCESS FLOW SCHEMES

I
CONVERSION OF WATER-BASED MUD TO LIME MUD BEFORE SOLIDIFICATION

EXEMPLARY MUDS

1) LIGNO SULFONATE
2) GYPSUM
3) PHPA (a) DISPERSANT MAY BE REQUIRED (b) CONVERT FLUID TO A LIME DRILLING FLUID BY ADDITION OF LIME (c) ADD LIME, COAL SLAG AND OPTIONAL SET CONTROL ADDITIVES (ACCELERATORS/RETARDERS)

II
SOLIDIFICATION OF LIME MUD

EXEMPLARY MUDS

1) HIGH LIME
2) LOW LIME
3) LOW LIME/SALT/ALCOHOL (d) DISPLACE MUD (e) SET

COAL SLAG SOLIDIFICATION OF DRILLING FLUID

BACKGROUND OF THE INVENTION

This invention relates to drilling fluid solidification.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners may be hung inside the casing.

At this point it becomes necessary to dispose of the used drilling fluid and to fill the annulus between the casing and the borehole wall or between the liner and casing with a material which will seal the annulus (interfacial sealing) to inhibit communication between various formations penetrated by the wellbore and which will provide structural support for the casing or liner. This is commonly referred to as primary cementing.

Bonding of the cement to the casing and borehole surfaces is critical to providing an effective seal in the annulus and for providing support for casings. Under most conditions, the bonding of cement to casing is achieved through contact of the cement particles with the surface of the casing. The resulting region of contact provides a mechanical interface which impedes movement of the casing due to high frictional forces. A fluid seal between cement and casing is also effected by the close contact of the cement particles at the casing surfaces which results in a region of very low effective permeability that prevents fluid migration along the interface.

Bonding between the cement and borehole wall is also achieved through contact of the cement particles with the formation or drilling fluid filter cake commonly deposited at the borehole wall during the drilling of the borehole. However, bonding or interfacial sealing between the cement and borehole surfaces is not readily achievable.

Generally, the borehole into which the casing or liner is introduced is filled with drilling mud. Conventional Portland cement and conventional drilling muds are incompatible. Thus, a mixture of conventional Portland cement and conventional drilling mud will not set up into a strong cement. In addition, the viscosity of such mixtures becomes uncontrollable and may either become too viscous to pump or may get thinner.

At the completion of drilling, the used drilling fluid is displaced from the borehole using some means to keep it separate from the cement to follow. This creates two problems. First, the means developed by the industry to keep the drilling fluid separate is relatively complex, involving the use of a landing collar and a pair of wiper plugs. In addition, the thus-displaced drilling fluid must be disposed of Wyant et al, U.S. Pat. No. 3,499,491 (Mar. 10, 1970) proposed a partial solution to this problem by mixing a cementitious material such as Portland cement with powdered sodium silicate glass and a treated drilling fluid. While this does solve the problem of drilling fluid disposal since the drilling fluid is incorporated into the cement, it necessitates the use of extraneous components in order to achieve a sufficient degree of compatibility to make the cement work at all.

Cowan and Hale, U.S. Pat. No. 5,058,679 (Oct. 22, 1991) disclose solidifying drilling fluid by admixing blast furnace slag with the drilling fluid. Tragesser, U.S. Pat. No. 3,557,876 (Jan. 26, 1971) refers to drilling fluids containing pozzolans although no working examples are given. Phillip et al, U.S. Pat. No. 4,576,761 (Jul. 12, 1988) discloses modification of coal slag with lime to produce a cementitious material which can thereafter be activated with lime.

It would be desirable to have a cementitious material which could be solidified over a wide range of temperature including the very high temperatures now encountered in many drilling operations and give good interfacial sealing.

SUMMARY OF THE INVENTION

It is an object of this invention to provide a method to solidify drilling fluids.

It is a further object of this invention to provide a cementitious composition from drilling fluid which is operable over a wide range of temperature including temperatures above 250° F. where Portland cement strength regression begins.

It is yet a further object of this invention to provide a cementitious material from drilling fluid which is operable even up to the 450° F. and higher temperatures encountered in some deep well formations.

It is yet a further object of this invention to achieve good interfacial sealing in wellbore cementing.

In accordance with this invention coal slag is admixed with a drilling fluid and the resulting cementitious slurry solidified.

BRIEF DESCRIPTION OF THE DRAWING

In the drawing, forming a part hereof, there is depicted a process flow scheme for two embodiments of the invention.

DETAILED DESCRIPTION OF THE INVENTION

It has been found that coal slag can be admixed with drilling fluid to produce a cementitious slurry which can be solidified over a wide range of temperatures and that the resulting slurry is compatible with additional drilling fluid and filter cake encountered in wellbore cementing.

Definitions

By "cementitious slurry" is meant a slurry comprising coal slag and ingredients which cause the slurry to harden.

By "lime" is meant either commercial lime, calcium oxide or calcium hydroxide.

By "activator system" or "secondary activator" is meant an optional component in addition to the lime and may either be a single activator or a mixture of activators.

By "direct fluid contact" between a displacement fluid and the cementitious slurry is meant that the displacement fluid directly contacts the upper surface of a column of cementitious slurry as opposed to having a solid wiper plug and/or spacer fluid disposed between the cementitious slurry and the displacement fluid. By "direct fluid contact" between the cementitious slurry and the drilling fluid or mud is meant that the cementitious slurry directly contacts the upper surface of a column of drilling fluid or mud as opposed to having a wiper plug and/or spacer fluid with a rupturable diaphragm disposed between the cementitious slurry and the drilling fluid or mud.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

As used herein "down" or "in" as it relates to a drill string or casing means in a direction toward the farthest reach of the borehole even though in some instances the borehole can be disposed in a horizontal position. Similarly, "up" or "out" means back toward the beginning of the borehole.

By "barrel" is meant a standard 42-gallon petroleum barrel.

Drilling Fluid

The drilling fluids which can be solidified in accordance with this invention include both aqueous drilling fluids and high water content invert emulsions. By "aqueous drilling fluids" is meant any fluid having water as the continuous phase including oil-in-water emulsions as well as oil-free water-based drilling fluids. By "high water content invert emulsions" is meant any drilling fluid having oil as the continuous phase with a relatively high content of water such as relaxed filtrate oil mud invert emulsions which have about 60:40 ratio of oil to water.

Many drilling fluids use a salt solution such as sea water and such drilling fluids can be solidified in accordance with this invention. However, preferred drilling fluids are free, or essentially free, of monovalent salts such as sodium chloride.

The drilling fluid can either be a lime mud or a non-lime mud which is converted to a lime mud. Exemplary muds include sea water/lignosulfonate, seawater/gypsum, and fresh water/partially hydrolyzed polyacrylamide (PHPA). Also suitable, though not preferred, are sodium chloride/partially hydrolyzed polyacrylamide muds.

The drilling fluids will naturally have drill solids contained therein including clay. Generally, the initial drilling fluid has clay such as prehydrolyzed bentonite in addition to any clay encountered during the drilling operation although essentially clay-free systems except for any clay encountered during drilling can also be used.

Generally, the drilling fluid will contain conventional fluid loss additives, for instance, synthetic polymers such as biopolymers, starch, polyalcohols, and carboxymethyl cellulose. In addition, the clay which is generally present in an amount within the range of 2 to 50, more commonly 5 to 30, still more commonly 10 to 20 lbs/bbl of drilling fluid serves as a fluid loss additive. While the invention is equally applicable to drilling fluids not containing such materials, when they are present, their function generally carries over to the cementitious slurry and provides a valuable ingredient for the cementitious slurry.

Similarly, if shale stabilization is a problem during drilling, the drilling fluid likely will contain a shale stabilizer. The polyalcohols, if present, also serve as shale stabilizers. Other shale stabilizers include alkali metal silicates such as sodium silicate and sodium chloride, if it is present.

The applicable drilling fluids may also contain weight materials such as barite (barium sulfate). Additional weight material is not likely to be necessary since the coal slag itself provides weight, but if desired, additional weighting material can be added. Alternatively, the drilling fluid may be diluted prior to incorporation of the coal slag if a lower density cementitious slurry is desired.

Drilling fluids frequently also contain deflocculants such as carbohydrate polymers which, if present, are generally present in the range of 0.5 to 10 lbs/bbl of drilling fluid.

The drilling fluid may also contain rheology control agents which are generally designed to increase the viscosity so as to enable the drill solids to be carried out of the well. In any event, the biopolymers and silicates referred to hereinabove also provide viscosity if they are present. Whether or not such viscosifying agents are present in the drilling fluid, the viscosity of the cementitious slurry can be adjusted by the addition of appropriate rheology control agents which generally constitute thinners as discussed hereinbelow since it is generally desirable to affirmatively thin or disperse the cementitious slurry.

Mixed Metal Hydroxide

Mixed metal hydroxides can be used in the drilling fluid to impart thixotropic properties. The mixed metal hydroxides provide better solids suspension. This greatly enhances the cementing in a restricted annulus, for instance.

The mixed metal hydroxides are particularly effective in muds containing clay such as sodium bentonite. Preferred systems thickened in this way contain from 1–20 lbs/bbl of clay such as bentonite, preferably 2–15 lbs/bbl, most preferably 7–12 lbs/bbl. The mixed metal hydroxides are generally present in an amount within the range of 0.1 to 1 lbs/bbl of drilling fluid, preferably 0.1 to 1.5 lbs/bbl, most preferably 0.7 to 1.2 lbs/bbl. A more detailed description of mixed metal hydroxides can be found in Burba, U.S. Pat. No. 4,664,843 (May 12, 1987).

Coal Slag

By "coal slag" is meant the hydraulic refuse from either the carbonization of coal or the burning of coal. The coal can be anything in the series from peat, brown coal and lignite, sub-bituminous coal, bituminous coal, to anthracite coal.

The term "carbonization" is meant to encompass coke production, coal gas production, coal tar production and the production of lighter hydrocarbons. One preferred source of coal slag is coal gasification processes such as are described in Alpert et al, U.S. Pat. No. 5,091,349 (Feb. 25, 1992), the disclosure of which is hereby incorporated by reference. Slag from the Lugri process for coal gasification is a specific example of applicable coal slag. A suitable coal slag is available from the Santrol Division of Fairmont Minerals under the trade name "BLACK MAGNUM". This is a water-quenched slag from the burning of lignite coal for heat. The other coal slags can also be water-quenched.

Preferably, the coal slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably between 4,000 $cm^2/g$ and 9,000 $cm^2/g$, most preferably between 4,000 $cm^2/g$ and 8,500 $cm^2/g$.

The coal slag is generally used in an amount sufficient to give a concentration of coal slag in the cementitious slurry within the range of 20 to 600 lbs/bbl, preferably 100 to 500 lbs/bbl, most preferably 150 to 300 pounds per barrel of cementitious slurry.

If desired, from 1 to 50 weight percent of the coal slag can be replaced with Portland cement, blast furnace slag and/or fly ash. That is, the weight ratio of Portland cement, blast furnace slag and/or fly ash to coal slag can be 1:99 to 50:50.

Activation

In its simplest form, activation may occur simply through an increase in temperature and/or the effect of residual silicate, if silicate is used in the drilling fluid.

In most instances, however, a divalent activator component and, optionally, a secondary activator system will be added to the drilling fluid in addition to the coal slag to speed up the setting time. The divalent metal component is preferably lime, either commercial lime, calcium oxide or calcium hydroxide which forms as a result of the contact of lime with water or moisture.

The preference for using at least some lime is particularly stong in coal slags having a low ratio of lime to silica such as those slags from higher carbon content coals.

As a general proposition, if the CaO/silica weight ratio of the coal slag is less than about 0.15:1, additional lime will generally be added so as to reach a ratio of at least 0.20:1, preferably at least 0.24:1, and in some instances, lime will be added to give a ratio of at least 0.5:1. Generally, lime is added to give a ratio within the range of 0.2:1 to 2.0:1.

The lime is generally used in an amount within the range of 5 to 200, preferably 10 to 150, more preferably 10 to 125 lbs/bbl of total drilling fluid. By "lbs/bbl" is meant lbs of CaO and/or the amount of CaO required to produce any Ca(OH)$_2$ added.

Other suitable divalent components include divalent metals whose salts are soluble in water or at least not totally insoluble such as magnesium oxide, calcium sulfate and calcium halides such as calcium chloride. Also applicable are aluminates such as calcium aluminate.

Secondary activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, sodium bicarbonate, titanium carbonate, potassium carbonate, potassium bicarbonate, sodium hydroxide, potassium hydroxide, potassium sulfate, potassium nitrite, potassium nitrate, sodium or potassium aluminate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate), for instance, can be used as the secondary activator in combination with calcium oxide. When mixtures of alkaline agents such as caustic soda and soda ash are used the ratio can vary rather widely since each will function alone. Preferably, about 1 to 20 lbs/bbl of caustic soda, more preferably 2 to 6 lbs/bbl of caustic soda are used in conjunction with from 2 to 50 lbs/bbl , preferably 2 to 20 lbs/bbl of soda ash. Generally, if used at all, 2 to 70 lbs/bbl of secondary activator is used in addition to, or instead of the divalent (lime) activator.

Retarders

Retarders are generally not required in the cementitious slurries of this invention since the coal slag will generally not set under normal cementing conditions without the presence lime and/or an activator. However, in instances where it is desired to postpone the onset of setting, retarders such as organic compounds in general, and more specifically, low molecular weight organic acids can be used. Lignosulfonates including both chromium lignosulfonate and chrome-free lignosulfonate which may be present for other reasons, also serve as retarders.

Retarders are generally compounds which have $OH^-$, COOH, $BO_3$ or $BO^-_4$ functional groups which are a part of or can be released from the compound in solution. Chelating agents are also retarding agents. Such agents include lignosulfates, citric acid, EDTA, and borax. Other retarding materials include phosphonates, such as those used in scale inhibition in oil and gas wells and also in water treatment processes for boilers, cooling towers, etc. Examples of such materials are phosphates marketed by Monsanto Company under the trade name "DEQUEST".

Other retarding materials include some phosphates such as sodium, potassium, calcium or magnesium glycerophosphates, borates such as boric acid and its salts, salts of organic acids such as sodium or potassium gluconate, sodium or potassium glucoheponate and sodium citrate. Organic amines can also be retarders.

Combinations of borax, boric acid or other borate salts and some borate ester surfactants such as monoethanolamine borate with lignosulfonate or organic acid salts are good high temperature retarders. These are commonly used for high temperature retarders for cements. Salts of organic polyacids such as EDTA, polyacrylic acid, polymethacrylic acid, itaconic acid, fumaric acid can also retard in some temperature ranges.

Thinners

Generally, it is desired to thin or disperse the cementitious slurry so as to make it more pumpable. Chromium lignosulfonate may be used as a thinner although since it also functions as a retarder it is generally not preferred.

Other suitable thinners include chrome-free lignosulfonate (thus lignosulfonates as a class are applicable thinners), lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, sulfomethylated tree extract, stearyl amine and lauryl amine surfactants, sulfonated styrene-toluene copolymers, and mixtures thereof.

Polyalcohols

If desired, a polyalcohol can be utilized to improve the bonding of the cement. Suitable polyalcohols are disclosed in Cowan and Hale, U.S. Pat. No. 5,020,598 (Jun. 4, 1991) and said Cowan and Hale patent, U.S. Pat. No. 5,058,679, the disclosures of which are hereby incorporated by reference.

If a polyalcohol is used, it may be desirable in some instances to use one modified with an epoxy resin.

The epoxy resin can be used in an amount sufficient to give 0.5 to 5 wt % material from the epoxy resin incorporated in the epoxy polyethercyclicpolyol. Alternatively, a relatively high epoxy content can be utilized, say 6 to 75, preferably 20 to 45 wt %. Thus, viewed in terms of the polyol, the epoxy component content can vary from 0 to 67 wt % based on the total weight of the polyol.

The initial pressure can be higher when making the higher epoxy material as compared with the initial pressure preferred for the low epoxy. For instance, the initial pressure can be greater than 180 torr. Generally, the initial pressure will be between 250 and 500, preferably 250-350 torr, i.e., a vacuum, when the starting polyhydric alcohol component is glycerine. If desired, the reaction can be terminated before 1.107 moles of water are removed per mole of polyol reactant. Preferably, the polyhydric alcohol monomer is introduced into the reaction zone in a single addition and the epoxy introduced in a plurality of additions, preferably 2 to 10, most preferably 3 to 6 when utilizing the higher epoxy. Generally, if higher epoxy content materials are being produced, more additions are utilized and the addition of the epoxy could be continuous. With the high epoxy content materials, diglycidyl ethers are preferred instead of the tri- and tetraglycidyl ethers.

Another class of polyalcohols is ethoxylated propoxylated alcohols of the following general formula $$R[(EO)_m-(PO)_n]_z OH$$

where
EO = an ethoxy unit
PO = a propoxy unit
R = an alkyl chain of 2-16 carbon atoms, preferably 3-16, most preferably 4-10 carbon atoms. At least one of m or n is greater than 0. In these EO/PO copolymers, m and n are variable and the sum of m plus n determines their number average molecular weight, which ranges from 500 to 15,000, preferably from 600 to 10,000.

The concentration of the polyalcohol, if used, can be from 1-50, preferably 3-30, more preferably 5-25 volume percent based on the volume of the water phase of the drilling fluid.

DETAILED DESCRIPTION OF THE DRAWING

In the Figure, there are Process Flow Schemes I and II. In Process I, the first step 1), step (a), is the optional addition of a dispersant, e.g., sodium acrylate. If used, about 1 to 10 lbs/bbl of drilling fluid is usually suitable. In step (b) the drilling fluid is optionally converted at this point to a lime based drilling fluid by the addition of lime and, optionally, viscosity reducers. About 1 to 10 lbs/bbl of drilling fluid is generally sufficient. Also, about 1 to 10 lbs of viscosity reducer (such as styrene sulfonic acid maleic and hydride copolymers) per barrel of drilling fluid is usually suitable but may not be required.

Alternatively, the coal slag, lime or other primary accelerator and other set control additives are all added in step (c) to simultaneously convert the mud to a lime mud and provide the lime generally desired for the purpose of speeding up the setting.

Process II pertains to a solidification of a mud which is already a lime mud. Lime muds are generally preferred in practicing the invention, in part due to the solidification of the filter cake deposited by lime muds during drilling. This results in improved hardening of the filter cake. Exemplary muds are (1) high lime, (2) low lime, and (3) low lime/alcohol. By "low lime" is meant a mud having about 0.5 to 3, generally 0.5 to 2 lbs of unreacted lime per barrel of mud. By "high lime" is meant a mud having from greater than 3 to about 15 lbs of unreacted lime per barrel of mud. The low lime/alcohol mud generally has from 1 to 3 lbs of unreacted lime, and about 1 to 168 lbs of alcohol per barrel of drilling fluid. While less preferred, this can also be a low lime/salt/alcohol mud having, in addition, 18 to 109 lbs of sodium chloride per barrel of drilling fluid.

After addition of the coal slag and set control additives to create the cementitious slurry, the mud is displaced as shown in step (d) and allowed to set as shown in step (e).

Displacement

Conventional displacement techniques can be used to displace the drilling fluid with the cementitious slurry. However, because of the inherent compatibility of the drilling fluid and the cementitious slurry, wiper plugs and/or spacer fluids can be omitted. Thus, the cementitious slurry can be placed in direct fluid contact with the drilling fluid and the drilling fluid displaced out of the annulus between a pipe being cemented and a surrounding wall. The cement is, in turn, displaced into the annulus by direct fluid contact with a displacement fluid such as seawater.

Generally, this involves introducing a cementitious slurry into a casing or liner followed by the displacement fluid and displacing the cementitious slurry down the casing or liner and back up into the annulus surrounding the casing or liner.

EXAMPLE 1

Cementitious slurries were prepared from the mud described hereinbelow plus coal slag with various amounts of lime. The results show that a set cement was produced.

| Mud |
|---|
| 10 lbs/bbl bentonite |
| 5 lbs/bbl lime |
| 1 lbs/bbl chrome lignosulfonate |
| 20 lbs/bbl drill solids |

| 350 mls of the mud + 200 grams Coal Slag | | |
|---|---|---|
| Added Lime grams | CaO:SiO$_2$ wt. ratio | 72 hr Compressive Strength @ 300° F., psi |
| 32.3 | .5 | 100 |
| 58 | .75 | 110 |
| 83.6 | 1 | 240 |
| 109.25 | 1.25 | 250 |

In the following series of runs the same mud was combined with a higher concentration of lime. The results show 72 hour strengths as high or 420 psi.

| 350 mls of the mud + 200 grams Coal Slag | | |
|---|---|---|
| Added Lime grams | CaO:SiO$_2$ wt. ratio | 72 hr Compressive Strength @ 300° F., psi |
| 50.95 | 0.5 | 80 |
| 89.4 | 0.75 | 165 |
| 127.9 | 1 | 350 |
| 166.4 | 1.25 | 420 |

While this invention has been described in detail for the purpose of illustration, it is not to be construed as limited thereby but is intended to cover all changes and modifications within the spirit and scope thereof.

What is claimed is:

1. A method for solidifying a drilling fluid in a borehole, said drilling fluid being a lime mud or a non-lime mud which is converted to a lime mud by addition of lime, comprising:

admixing coal slag with said drilling fluid to produce a cementitious slurry;

displacing said cementitious slurry into said borehole; and allowing said cementitious slurry to solidify in situ.

2. A method according to claim 1 wherein said non-lime mud is converted to a lime mud by addition of lime and a viscosity reducer prior to the addition of said coal slag.

3. A method according to claim 1 wherein 10 to 50 lbs/bbl of lime is also incorporated into said drilling fluid in producing said cementitious slurry.

4. A method according to claim 3 wherein said coal slag is incorporated into said cementitious slurry in an amount within the range of 100 to 500 lbs/bbl of said cementitious slurry.

5. A method according to claim 1 wherein said coal slag is incorporated into said drilling fluid in an amount sufficient to give 100 to 500 lbs/bbl of said cementitious slurry.

6. A method according to claim 1 wherein said coal slag is introduced in an amount sufficient to give 150 to 300 lbs/bbl of said cementitious slurry.

7. A method according to claim 1 wherein said lime constitutes the only activator added to said drilling fluid and wherein said lime is added in the form of calcium hydroxide.

8. A method according to claim 1 wherein said coal slag is a quenched slag from the carbonization of coal.

9. A method according to claim 1 wherein said coal slag has a particle size such that it exhibits a Blaine specific surface area within the range of 4,000 to 9,000 cm$^2$/g.

10. A method according to claim 1 wherein a lignosulfonate viscosity reducing agent is added to said drilling fluid in said production of said cementitious slurry.

11. A method according to claim 1 wherein said cementitious slurry contains in addition a component selected from Portland cement, blast furnace slag and fly ash.

12. A method according to claim 11 wherein said coal slag is quenched coal slag from the burning of coal in the production of heat and wherein said coal slag has a particle size such that it exhibits a Blaine specific surface area within the range of 4,000 to 9,000 cm$^2$/g, said lime is added in the form of calcium hydroxide and in amount within the range of 10 to 40 lbs/bbl of said drilling fluid, and wherein said coal slag is added in an amount within the range of 150 to 300 lbs/bbl of said cementitious slurry.

13. A method according to claim 12 wherein said cementitious slurry is passed into direct fluid contact with drilling fluid in said borehole to displace said drilling fluid and wherein a displacement fluid in direct fluid contact with said cementitious slurry displaces said cementitious slurry into said annulus.

* * * * *